United States Patent

[11] 3,544,766

[72] Inventor Nicholas G. Muskovac
 Rockville, Maryland
[21] Appl. No. 748,242
[22] Filed July 29, 1968
 Continuation-in-part of Ser. No. 539,022,
 Mar. 31, 1966, now Patent No. 3,417,320
[45] Patented Dec. 1, 1970
[73] Assignee Vectrol Inc.
 Rockville, Maryland
 a corporation of Maryland

[54] TIME PROPORTIONAL FIRING CIRCUIT
 8 Claims, 3 Drawing Figs.
[52] U.S. Cl. .................................................. 219/501,
  307/252; 219/511
[51] Int. Cl. .................................................. H05b 1/02
[50] Field of Search .......................................... 219/501,
  504, 505; 307/252, 310

[56] References Cited
UNITED STATES PATENTS
3,161,759 12/1964 Gambill et al. ............... 219/501
3,356,784 12/1967 Bertioli et al. ............... 219/501

Primary Examiner—Bernard A. Gilheany
Assistant Examiner—F. E. Bell
Attorney—Fleit, Gipple & Jacobson ABSTRACT: A sensing branch of a thyristor circuit is cycled to provide a secondary firing cycle imposed on the primary cycle resulting from sensor response to average environmental conditions. The secondary cycle is achieved by either electrical cycling within the sensing branch or by providing intermittent sensor stimuli in addition to the average environmental condition.

PATENTED DEC 1 1970

3,544,766

3,544,766

TIME PROPORTIONAL FIRING CIRCUIT

CROSS REFERENCES TO RELATED APPLICATIONS

The present application is a continuation-in-part of copending application Ser. No. 539,022 filed in the name of Nicholas G. Muskovac on Mar. 31, 1966 and issued as U.S. Pat. No. 3,417,320 on Dec. 17, 1968.

BACKGROUND OF THE INVENTION

This invention relates to control circuits for solid state controlled rectifiers and more particularly to a time proportional firing circuit for controlled rectifiers.

Time proportional control of controlled rectifiers, such as thyristors and the like, is advantageous since average power to the load may be controlled while maintaining a constant peak voltage during the "on" time period. This is particularly useful where is it is desirable to control only the average power of a voltage sensitive load. It is also applicable to low noise control circuits in which the thyristor device is fired only at the initiation of conductive half-cycles.

In the prior art, time proportional control is generally achieved by pulsing the gate input. However, circuits of this type are often costly networks which require an excessive number of components. In addition, such circuits often fail to provide automatic control of the average power in response to environmental conditions, and also fail to take into account load size and time lag of the environment which result in system hunting.

It is an object of this invention to provide a time proportional firing circuit.

It is another object of this invention to provide a low noise time proportional firing circuit for thyristors.

It is a further object of this invention to provide a firing circuit having a time proportional firing cycle generated by direct feedback from the load circuit.

It is a still further object of this invention to provide a firing circuit having a primary control cycle responsive to a main load and a secondary proportional control cycle responsive to an auxiliary load of the circuit.

It is a further object of this invention to provide a control circuit having an auxiliary load closely coupled to the circuit sensor which cycles the sensor in a secondary or auxiliary mode superimposed on the primary firing cycle which results from sensor response to the environmental condition produced by the main load.

These and other objects of the invention will be apparent upon consideration of the following specification taken in conjunction with the drawing.

SUMMARY OF THE INVENTION

In accordance with the invention, a firing circuit for proportionally controlling energy to a load from an alternating source, comprises: a thyristor in series connection with said load and source; a gate circuit in connection to the gate of said thyristor and said source for the generating and application of trigger pulses to said gate, said gate circuit having a sensor branch which includes a condition-responsive impedance, said sensor branch controlling the application of said trigger pulses with respect to conductive half-cycles of said source in response to said condition and initiating thyristors conduction in response thereto; and means for cycling said sensor branch to provide time proportional control of said thyristor.

In one embodiment, the cycling means is included within the sensor branch and impresses a cyclic voltage variation on said impedance. In another embodiment, an auxiliary load which produces the condition is fired with the main load and is closely coupled to the condition-responsive impedance so as to cause a secondary firing cycle imposed upon the primary cycle resulting from impedance response to average environmental condition.

DESCRIPTION OF THE PREFERRED EMBODIMENT

Figure 1:
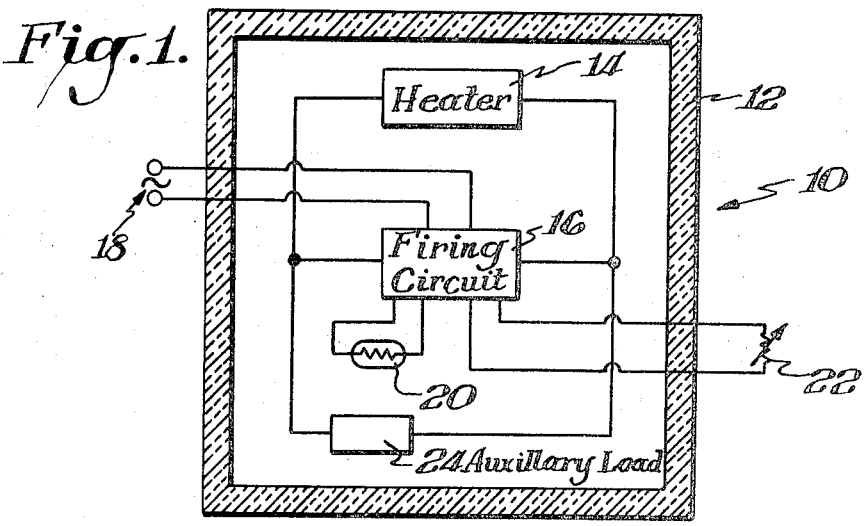
FIG. 1 is a partly diagrammatic view of a heating chamber and control circuit provided in accordance with the invention.

In FIG. 1, an oven 10 is shown which includes an enclosed chamber 12 and an electrically controlled heating unit 14. Power to heating unit 14 is controlled by a firing circuit 16 which is energized by an a.c. source 18. Firing circuit 16 is primarily controlled by a condition-responsive impedance or sensor 20. In this embodiment, sensor 20 is a positive temperature coefficient resistor such as a thermistor or the like which is responsive to the surrounding air temperature, and which triggers the firing circuit to energize or turn "on" heater 14 in accordance with the temperature of compartment 12.

A potentiometer 22 is included in the circuit for selection of the desired chamber temperature, that is a particular switching point ("on-off" value) of firing circuit 16. The chamber also includes a directly coupled feedback element or auxiliary load 24 mounted adjacent to and in the vicinity of sensor 20. This feedback element 24, which is coupled to the main heater 14 and fired with it, produces a secondary cycle, or pulsed firing mode, superimposed on the primary cycle of circuit 16.

Figure 2:
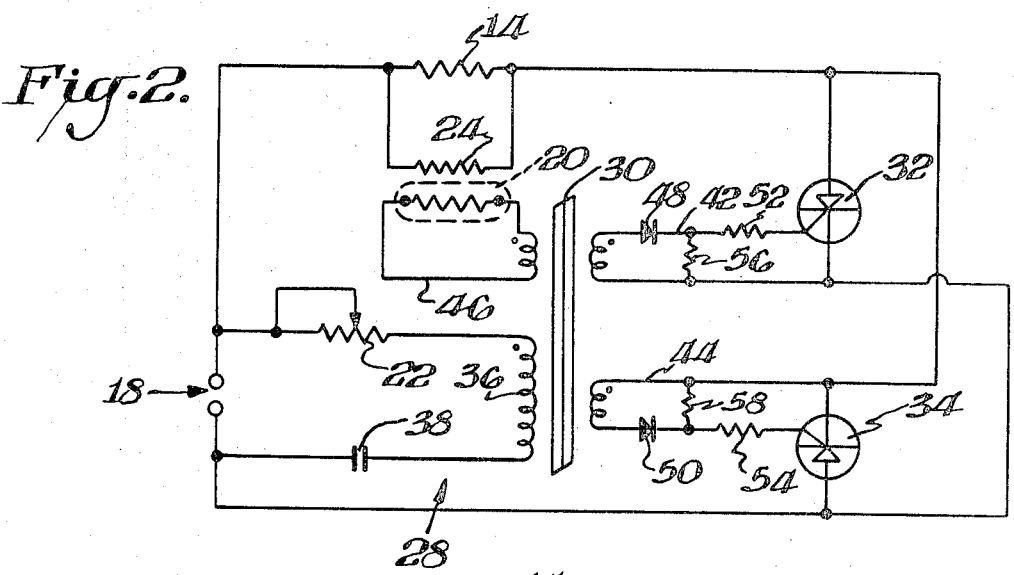
FIG. 2 is a schematic diagram of the heating control circuit of FIG. 1.

An example of a full wave circuit is shown in FIG. 2, wherein a low noise control circuit of the type described in the parent application is employed with the secondary control provided by feedback element 24. In this circuit, a square core transformer 30 is utilized to generate and apply trigger pulses to thyristors 32, 34 which are connected in a back to back or antiparallel arrangement for full wave operation. In this example, elongation of the input pulse to transformer 30 is used to control the firing as explained in the parent application.

In the this circuit, a.c. from source 18 is fed to a phase shifting network 28 which includes potentiometer 22, transformer primary 36, and capacitor 38. Network 28 is manually set to provide a phase leading voltage to transformer 30 which is, in turn, coupled to thyristors 32 and 34 by secondary windings included in gate branches 42, 44. The square core transformer provides a pulse having a fast fall time or steep trailing edge which occurs at saturation of the core.

For low noise operation, the leading phase angle is adjusted so that the trailing edge occurs at the zero crossing of the a.c., and the turning "on" or triggering of the thyristors is then controlled by lengthening or shortening the transformer pulse (by varying the square core saturation point) in accordance with the impedance of network 46, or that is in accordance with the impedance of sensor 20.

In its primary cycle, sensor 20 controls the firing of heater 14 in response to the average temperature of the air (or other material enclosed within chamber 12). Hence, when the air temperature falls below a chosen level sensor 20 provides a lowered impedance of circuit 46, and a sufficient increase in pulse length to move the trailing edge of the gate pulse within a conductive half-cycle so as to initiate conduction of the thyristors.

The "on" portion of the primary cycle is completed when the environment has reached a sufficient average temperature to make sensor 20 (and circuit 46) high enough in impedance to pull the trailing edge back out of conductive half-cycles so as to allow the thyristors to stop conducting.

However, auxiliary load 24, which in this example is a resistor or the like, also heats sensor 20 and superimposes a secondary cycle on the circuit. That is, each time heater 14 is initially turned "on" (start of the primary cycle) auxiliary load 24 is also fired, but due to its close coupling or proximity to sensor 20, it has an immediate and direct influence on the sensor 20. Hence, auxiliary load 24 raises the temperature of sensor 20 very rapidly and essentially shuts "off" thyristors 32, 34. Thereafter depending upon dissipation factors of load 24 etc., sensor 20 cools to the average room temperature whereupon it switches heater 14 (and element 24) "on" again. This process repeats itself until the average room temperature equals, or slightly exceeds, the selected value preset by means of potentiometer 22.

Consequently, in the primary cycle sensor 20 responds to the time average temperature of the chamber and accordingly provides an "on" or "off" gate pulse to the thyristors whereas it also responds (in the secondary cycle) to the proximate environment or condition created by element 24. Hence during any "on" portion of the primary cycle, sensor 20 is also influenced by the direct feedback to which it responds by shutting the heater power "off".

Consequently, the primary cycle is modified by a time proportional firing which results from the continual interruption of the primary cycle by sensor response to the auxiliary load 24. This provides an automatic time proportional firing in which the auxiliary load element 24 coacts with sensor 20 to pulse the primary firing cycle. Stated otherwise the sensor response is employed for both a main switching "on" and "off" (primary cycle) and a minor switching rate (auxiliary cycle).

Advantageously, loads which would normally cause large overshooting of the sensor setting can be pulsed in this arrangement to provide time averaging. Hence, the direct feedback provides a vernierlike regulation on the main load. This minimizes hunting of the system and precisely maintains the environment of a large volume by means of a heavy load of restricted size, since the main load is fired in response to the combination of both the average condition of the environment and the transitory condition produced by the auxiliary load. Of course, this regulation results from the close coupling of sensor 20 to auxiliary load 24 in combination with its more remote, or loose coupling, to main load 14.

The primary cycle is determined by chamber volume, main load size, and thermal loss from the chamber etc. while the secondary cycle (which is essentially the duty cycle of the primary cycle) is dependent upon both the response time (thermal rise and dissipation) of auxiliary load 24 and its coupling to sensor 20. Consequently, if the auxiliary load is closely coupled to the sensor, for example resistive load 24 may be included within the same casing or package as sensor 20 but electrically insulated from it, the secondary or time proportional cycle will essentially depend on the thermal rise and fall of the auxiliary load. Additionally, the response time of firing circuit 16 and that of sensor 20 will also have some effect on this cycle, but since their response time is relatively fast, they provide only a small contribution to the secondary duty cycle and hence are omitted from the discussion for reasons of clarity.

As an example, a circuit constructed in accordance with FIGS. 1 and 2 and with the parameters listed below exhibited a cycle having a cycling time of 2 minutes. The auxiliary load, in this example, was positioned adjacent to and almost touching the dielectric casing of sensor 20.

AC Source 18—230 volts.
Sensor 20—Sprague Al-9010-170 (PTC).
Auxiliary Load 24—150,000 ohms, ⅓ watt.
Heater 14—200 watts.
Potentiometer 22—10,000 ohms.
Transformer 30—800T:800T/200T:200T on Sprague core D572X40-F3.
Capacitor 38—0.27 mfd.
Diodes 48, 50—100 volts, 500 ma.
Resistors 52, 54—100 ohms.
Resistors 56, 58—1,000 ohms.

It should be noted that in this embodiment the auxiliary load and main load both produce the same environmental condition, that is both loads produce heating or temperature changes to which the sensor responds. In every case, the auxiliary load must produce the stimuli or condition to which the sensor responds, however, the main load need not always do so. That is, the sensor may be selected to respond to an environmental condition which is not produced by the main load, but is produced by the auxiliary load. In this case of course, the primary cycle would then be controlled by something external to the system shown.

It should also be understood that even though in the given example the phase angle of the gate pulses remains constant, time proportional firing as described may also be produced by phase cycling as suggested in the parent application. For example instead of elongating the pulse to cause firing, sensor 20 may be made to produce a slight shift in phase to bring about the same effect. In other words, the secondary cycle imposed by the auxiliary load may be employed to produce a phase cycle as well as the described pulse length cycle to pulse the firing of thyristors 32 and 34.

Figure 3:
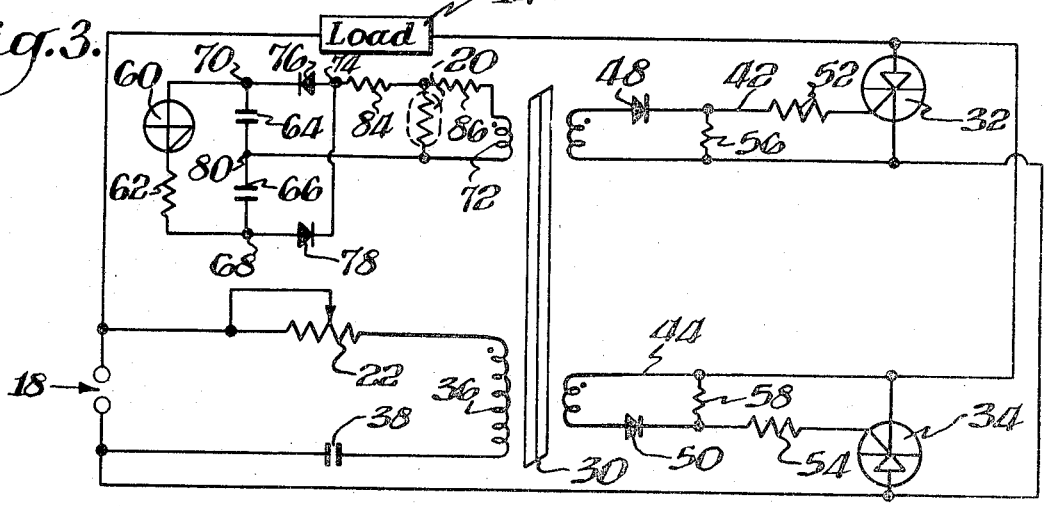
FIG. 3 is a schematic diagram of another embodiment which utilizes electronic cycling.

In a further embodiment, shown in FIG. 3, the thyristor circuit is automatically time cycled by including sensor 20 within an electronic cycling circuit which includes a four-layer diode 60 connected in series with a current limiting resistor 62 and across a pair of capacitors 64 and 66.

Capacitors 64 and 66 are connected as a series string in parallel with diode 60. Each end 68 and 70 of the capacitor string is in connection to one end of sensor 20 (and transformer loop 72) by connection to junction 74, and each capacitor is polarized by diodes 76, 78 which are connected between junctions 68, 74 and 70, 74 respectively. The circuit is completed by connection of the capacitors, at a common junction 80, to the other side of sensor 20 and transformer 72. Appropriate resistors 84 and 86 are provided to adjust the charging rate of capacitors 64 and 66 and the impedance of the circuit so that it will oscillate by alternately charging each capacitor through its respective diode and by discharging each through the four-layer diode 60. The oscillation provides a variation in voltage across sensor 20 and transformer 72 which automatically superimposes a secondary "on"-"off" cycle on the sensor-controlled cycle, and provides pulsing or time proportional firing of the circuit.

The component values of the electronic cycling circuit including sensor 20 and winding 72 determine its oscillation frequency and impedance deviation. For example, a circuit constructed in accordance with FIG. 3 and with the parameters listed below exhibited a secondary or time proportional cycle of about 1 second.

AC Source 18—115 volts, 60 Hz.
Sensor 20—Sprague Al-9010-170 (PTC).
Load 14—200 watts.
Potentiometer 22—5,000 ohms.
Transformer 30—800T:800T/200T:200T on Sprague core D572X40-F3.
Diodes 48, 50, 76, 78—100 volts, 500 ma.
Resistors 52, 54—100 ohms.
Resistors 56, 58—1,000 ohms.
Diode 60—Shockley 4E20, 20 volts.
Capacitors 64, 66—10 mfd.
Resistor 62—47 ohms.
Resistor 84—6,800 ohms.
Resistor 86—220 ohms.

Each of the illustrated and described circuits provide low noise operation, however, the time proportional firing of either embodiment can be utilized with many different circuits which utilize a condition-responsive impedance for a firing control. The sensing means may be made responsive to the condition produced by the auxiliary load or both loads, or employed with an electronic cycling means. Additionally, the electronic cycling may be employed with the fixed impedance of manually controlled firing circuits.

Thus, many different modifications are possible without departing from the spirit and scope of the invention and it should be understood that the invention is not to be limited except as in the appended claims.

I claim:

1. A firing circuit for proportionally controlling the application of energy to an electrical load from an alternating current source, said circuit comprising at least one thyristor in connection between said source and said load; a gate circuit in connection to the gate of said thyristor for generation and application of trigger pulses thereto, said gate circuit including a condition-responsive sensor which controls the application of said trigger pulses to said gate during conductive half-cycles of said source for firing of said thyristor; and said firing circuit including an auxiliary load for cycling the impedance of said sensor so as to provide proportional firing of said thyristor; said auxiliary load being coupled to the main load and fired in accordance therewith; said auxiliary load providing an environmental condition to which said sensor is responsive; and said auxiliary load being disposed in close proximity to said sensor so as to rapidly produce a transitory environmental condition in said proximity and thereby provide a secondary cycle of sensor response imposed upon the primary cycle resulting from sensor response to the time-averaged condition of the environment.

2. The circuit of claim 1 wherein said gate circuit is a low noise circuit which provides said trigger pulses only at the initiation of said conductive half-cycles.

3. A firing circuit for proportionally controlling the application of energy to an electrical load from an alternating current source; said circuit comprising a pair of thyristors in antiparallel connection between said source and said load; a gate circuit in connection to the gate of each thyristor for generation and application of trigger pulses thereto, during conductive half-cycles thereof; said gate circuit including a sensing means having a condition responsive impedance for controlling the application of said trigger pulses to said gates for firing of said thyristors; and an oscillating network coupled to said impedance for providing a cyclic variation in voltage thereon, said oscillating network including a pair of capacitors, a diode in series with each capacitor for charging each on alternate half-cycles of said source, a discharging means connected in series with said capacitors for the discharging thereof, and each of said capacitors connected across said impedance for providing an oscillation thereof in accordance with said charging and discharging.

4. The circuit of claim 1 wherein said main and auxiliary load produce the same environmental condition, and said sensor providing a primary firing cycle in response to the environmental condition produced by said main load and a secondary cycle in response to the environmental condition produced by said auxiliary load.

5. The circuit of claim 4 wherein said main and auxiliary loads are heat producing elements and said sensor is responsive to temperature.

6. The circuit of claim 5 wherein said main load is a heavy duty heater of discrete size located at one end of a substantially enclosed chamber, said sensor is located at the other end of said chamber, and said auxiliary load is a comparatively small heating element located close to said sensor.

7. The circuit of claim 4 wherein said gate circuit is a low noise circuit comprising a square core transformer coupled to said gate, a phase leading input to said transformer, and said sensor is a temperature-responsive impedance connected across a secondary winding of said transformer, and said auxiliary load is an electrical heating element thermally coupled in close relation to said sensing means.

8. The circuit of claim 7 wherein said sensor is a positive thermal coefficient impedance, and said auxiliary load is a resistive element connected in parallel across said main load.